Figure 1:
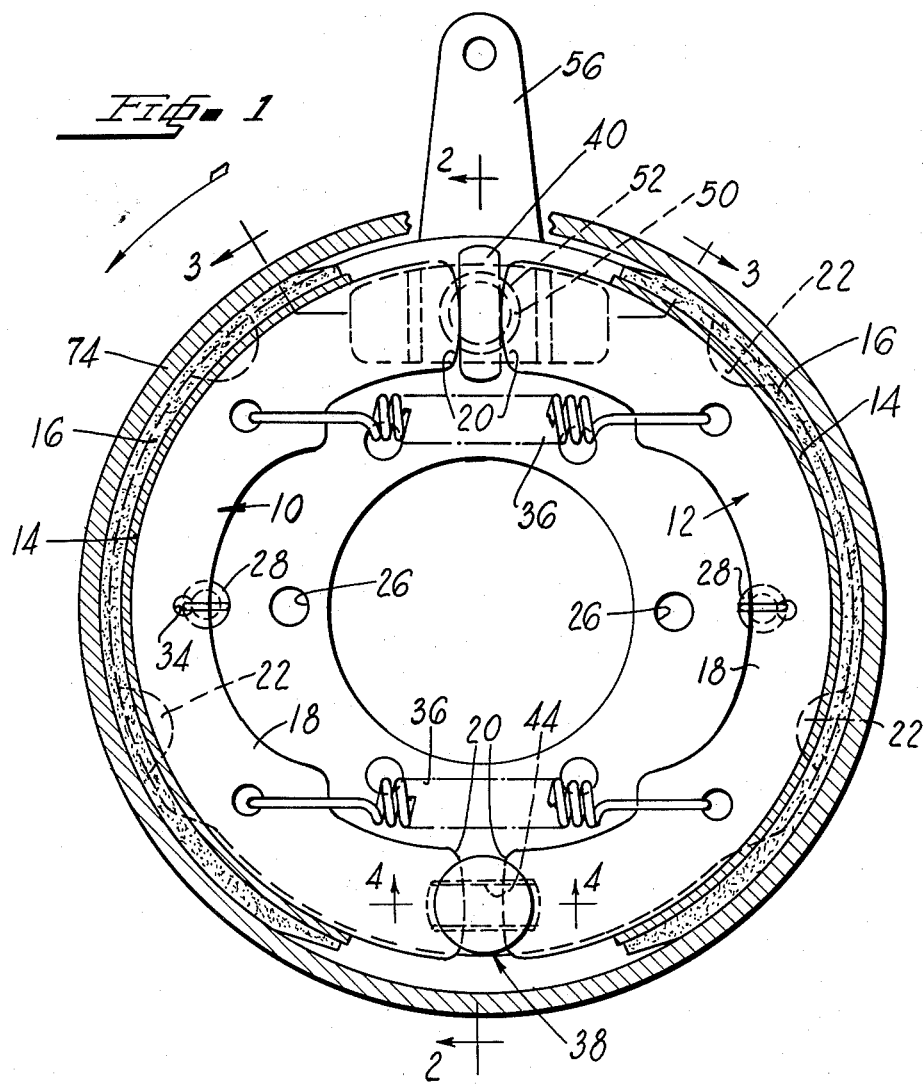

July 9, 1963 E. K. DOMBECK 3,096,857
BRAKE
Filed April 27, 1961 2 Sheets-Sheet 1

INVENTOR.
EDWARD K. DOMBECK
BY John A. Young
ATTORNEY

July 9, 1963  E. K. DOMBECK  3,096,857
BRAKE
Filed April 27, 1961  2 Sheets-Sheet 2
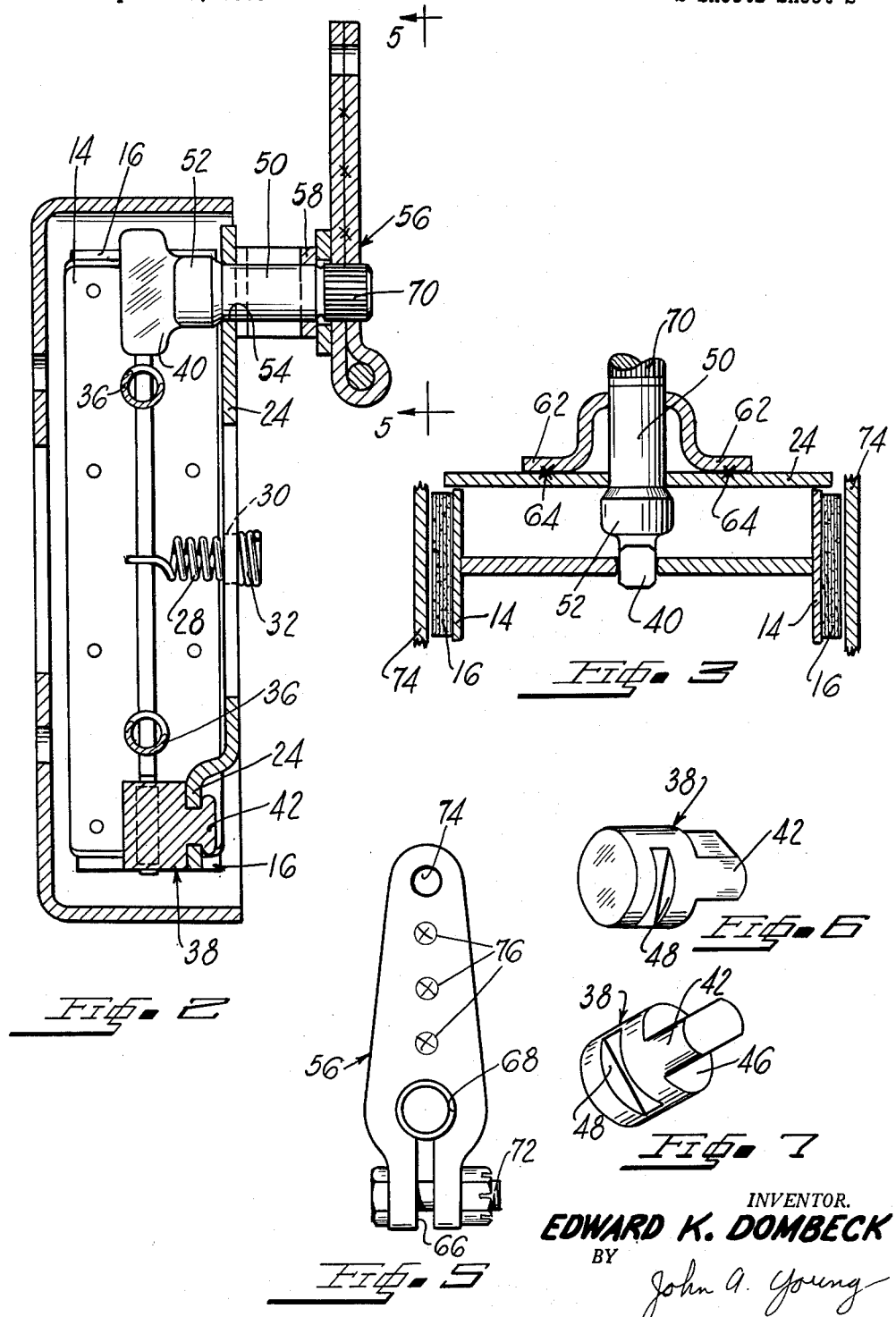
INVENTOR.
EDWARD K. DOMBECK
BY
John A. Young
ATTORNEY United States Patent Office 3,096,857
Patented July 9, 1963

3,096,857
BRAKE
Edward K. Dombeck, South Bend, Ind., assignor to The Bendix Corporation, South Bend, Ind., a corporation of Delaware
Filed Apr. 27, 1961, Ser. No. 106,112
1 Claim. (Cl. 188—78)

This invention relates to a brake and more specifically to a mechanically actuated nonservo brake in which one pair of adjacent ends of the shoes are anchored and the other pair of adjacent ends are spread to effect a brake application.

One of the objects of the present invention is to provide an economical construction brake which is particularly adapted for use in small vehicle braking systems wherein there is limited space for locating the brake. In spite of the size of the vehicle the brakes still must provide the same functional operations and the brake regardless of size must have the same general standards of operation. For example the brake must be controllable, fade resistant, effective, and durable regardless of the vehicle size.

It is a foremost object of the present invention to produce a brake for small vehicles and embodying the advantages of high torque capacity, controllability and wear resistance and itself structurally simplified to produce these effects at a minimum expense.

A further object of the invention is to produce a novel combination shoe-support-and-anchoring structure which permits the shoes to move slidably along a line connecting their opposite ends and thereby contributing both to longer life and braking effectiveness.

Another object of the invention is to provide a novel brake actuating structure which is economical both to produce and to service and comprises a mechanical actuator which is supported for its brake actuating movement by a novel support structure which sustains a part of the braking load of one of the shoes in each direction of braking. The novel actuating structure includes a camshaft operating lever which is doubled over and welded and is so combined with the camshaft that it both operates and assists in positioning the camshaft.

A further object of the invention is that the brake shoes can be reversed end-for-end and can be used at one side or the other of the brake thus simplifying both assembly and servicing of the brake. Thus, should one brake shoe "wear ahead" of the other brake shoe the two can be cross exchanged to equalize the wear rates.

Owing to the small size of the brake, the floating condition of the shoe, and the fixed relation of the camshaft relatively to the shoe ends, the leading and trailing shoes are of about equal effectiveness and this makes the brake more heat resistant and therefore more stable.

Figure 4:
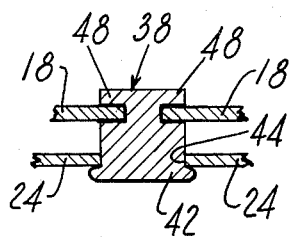

Other objects and features of the brake will become apparent from a consideration of the following detailed description which proceeds with reference to the accompanying drawings, wherein:

FIGURE 1 is a side elevation view of the brake constituting my invention;

FIGURES 2, 3 and 4 are sectional views taken on the respective section lines 2—2, 3—3 and 4—4 of FIGURE 1;

FIGURE 5 is a detail view of the actuator lever shown detached from the brake; and FIGURES 6 and 7 are isometric views of the anchor shown detached from the rest of the brake.

Referring to FIGURE 1, two brake shoes 10, 12 which are leading and trailing shoes respectively, are symmetrically constructed so that they can be reversed end-for-end and can be used at either side of the brake thus simplifying the cost of constructing the brake shoes and the servicing thereof.

Each shoe 10, 12 comprises a rim 14 having a lamination of friction material 16 and a transverse strengthening web 18 having convexly rounded ends 20 on which the shoes are free to pivot and slide during application.

The shoes are positioned laterally against spaced ledges 22 which are constructed integrally in a backing plate 24 having openings 26 which adapt the plate 24 for mounting onto a nonrotatable flange or the like (not shown) of the vehicle.

Two coil springs 28, one for each shoe, bias the shoes laterally into engagement with the ledges 22, and are passed through openings 30 with the larger coils 32 being caught at the inboard side of the backing plate 24 and the smaller diameter coils stretched to permit the spring to hook through opening 34 of the shoe web 18.

The adjacent shoe ends 20 of shoes 10, 12 are urged together by springs 36 which are stretched between the ends of the shoes to hold said shoes in a normally retracted position wherein one pair of the shoe ends engages an anchor 38 and the other pair of shoe ends engages a cam 40.

The anchor 38 is cylindrically shaped and has a rectangular boss 42 which fits through a companion opening 44 of support plate 24 bringing the shoulder 46 flatly against the support plate 24 with the anchor being perpendicularly disposed relatively to said support plate 24. The boss 42 is then upset and thereby riveted to the support plate 24. The anchor has two milled slots 48 which receive the webs 18 of shoes 10, 12 and which bottom in the slots 48 to anchor thereagainst and turn pivotally within the space provided by said slots 48 which also function to laterally locate the ends of the shoes. The anchor 38 can be turned 180° from its position shown in FIGURE 1 so that assembly of the brake can be further facilitated.

Cam 40 is located on the end of a camshaft 50 which also includes an enlarged integral boss section 52 which engages the edges of opening 54 to limit movement of the camshaft 50 in one direction and in the opposite lateral direction the camshaft is held by the lever 56 engaging the laterally offset portion 58 of support 60 having flange 62 welded at 64 to the support plate 24 (FIGURE 3).

The lever 56 consists of a doubled over sheet metal member which is split and gapped at 66 and includes complementary concave recesses 68 which are clamped over splined end 70 of camshaft 50 by an adjustable bolt 72. The lever is apertured at 74 for connection with rod, cable or the like (not shown) effecting turning of the camshaft 50 and consequent spreading of the shoes. The doubled over lever is welded at spaced points 76 to hold the lever sections together.

It will be apparent from the description that the brake comprises a minimum number of parts and wherever possible the parts are duplicated and are therefore interchangeable within the brake as for example the shoes, hold-down springs, shoe retracting springs etc. The anchor 38 can be located with either of its slots 48 facing a given shoe so that the anchor has two acceptable operating positions at the time of attachment to the backing plate 24.

In operation, the lever 56 is caused to rotate and camshaft 50 is likewise rotated and cam 40 spreads the shoes 10, 12 so that, assuming counterclockwise rotation of drum 74, the shoe 10 acts as a leading shoe and is self energizing and shoe 12 acts as a trailing shoe and is nonself-energizing. Since the two shoes are applied with the same cam force they each do approximately the same amount of braking work and consequently the brake is quite resistant to fade and the two shoes wear at approximately the same rate. Both shoes are free to slide at their opposite ends and are therefore self-centering to effect more even wear of the friction material 16 along its arcuate length.

The anchor 38 sustains the anchoring load of the shoes through its rectangular rivet head 42 and the major dimension of the rivet head is transverse the sliding engagement surface between the anchor and shoe and therefore the shape of the anchor increases its torque-sustaining ability.

The trailing shoe, whichever it may be during brake application, anchors through the cam 40 on camshaft 50 which is held at spaced points along its length by the backing plate 24 and bracket 58 both of which provide journal supports permitting rotation of the camshaft 50 but prevent angular movement thereof with the shoes (to the right or left in FIGURE 1).

Although the present invention has been illustrated in connection with a single example embodiment, it will be understood that this example is in no way restrictive of the invention. It is reasonable to be expected that those skilled in the art can make numerous revisions and adaptations of the invention that suit individual design preferences. It is intended that such revisions and adaptations as incorporate the herein disclosed principles will be included within the scope of the following claims as equivalents of the invention.

What is claimed is:

A brake comprising a pair of arcuate T-section brake shoes having a lined rim and a transverse strengthening web, each of said shoe webs having convexly shaped ends, a support plate for guiding shoe movement and providing spaced ledges which slidingly engage the edges of the rims of said shoes to support said shoes in their radial movement, two diametrically disposed hold-down springs each having a small diametered portion extending through an opening in the backing plate and stretched to extend into hooking relation with a respective one of said shoes and thereby bias said shoes laterally against said support plate, each of said springs having a plurality of coils which bear against said support plate and are proportioned to surround their backing plate opening without being pulled through said backing plate opening, actuating means for spreading said shoes and comprising a cam disposed between and acting against adjacent ends of said webs to effect their application, a camshaft having an enlarged diameter boss formed integrally therewith and limiting lateral movement of said camshaft in one direction through an opening in said backing plate, bearing means axially spaced from and rigidly connected to said support plate, said camshaft being so disposed to bear on said bearing means and the edges of its respective support plate opening during actuation of said shaft, lever means attached to said shaft for actuating the same, an anchor disposed between the other adjacent ends of said shoes and comprising a cylindrical member having a rectangular boss received through a companion opening of said support and rigidly connected to said support with the major dimension of said boss disposed collinearly with the direction of anchoring force acting against said anchor, and means forming two recesses of said anchor at opposite sides thereof and receiving the other rounded or convex ends of the webs of two of said shoes which thereby both anchor and slide within said recesses.

References Cited in the file of this patent
UNITED STATES PATENTS

| | | |
|---|---|---|
| Re. 17,688 | Evans | June 3, 1930 |
| Re. 24,886 | Brown | Oct. 18, 1960 |
| 1,515,019 | Evans | Nov. 11, 1924 |
| 1,730,928 | Flanigan | Oct. 8, 1929 |
| 1,812,168 | Perrot | June 30, 1931 |
| 1,822,687 | Bendix | Sept. 8, 1931 |
| 1,954,538 | Sanford | Apr. 10, 1934 |
| 2,248,171 | Hatch | July 8, 1941 |
| 2,396,387 | Rasmussen | Mar. 12, 1946 |
| 2,509,643 | House | May 30, 1950 |
| 2,614,663 | Joseph | Oct. 21, 1952 |